Sept. 30, 1952 M. H. MESNER 2,612,634

ANGULAR MODULATION

Filed Oct. 19, 1944 6 Sheets-Sheet 1

INVENTOR.
MAX H. MESNER
BY H. G. Grover
ATTORNEY

Sept. 30, 1952 M. H. MESNER 2,612,634
ANGULAR MODULATION
Filed Oct. 19, 1944 6 Sheets-Sheet 2

INVENTOR.
MAX H. MESNER
BY H. S. Grover
ATTORNEY

Sept. 30, 1952 M. H. MESNER 2,612,634

ANGULAR MODULATION

Filed Oct. 19, 1944 6 Sheets-Sheet 3

INVENTOR.
MAX H. MESNER
BY H. S. Grover
ATTORNEY

Sept. 30, 1952 M. H. MESNER 2,612,634

ANGULAR MODULATION

Filed Oct. 19, 1944 6 Sheets-Sheet 4

INVENTOR.
MAX H. MESNER
BY H. S. Grover
ATTORNEY

INVENTOR.
MAX H. MESNER
BY H. S. Grover
ATTORNEY

Sept. 30, 1952 M. H. MESNER 2,612,634

ANGULAR MODULATION

Filed Oct. 19, 1944 6 Sheets-Sheet 6

INVENTOR.
MAX H. MESNER
BY
H. S. Grover
ATTORNEY

Patented Sept. 30, 1952 2,612,634

UNITED STATES PATENT OFFICE 2,612,634

ANGULAR MODULATION

Max H. Mesner, Princeton, N. J., assignor to Radio Corporation of America, a corporation of Delaware Application October 19, 1944, Serial No. 559,469

23 Claims. (Cl. 332—25)

Figure 1:
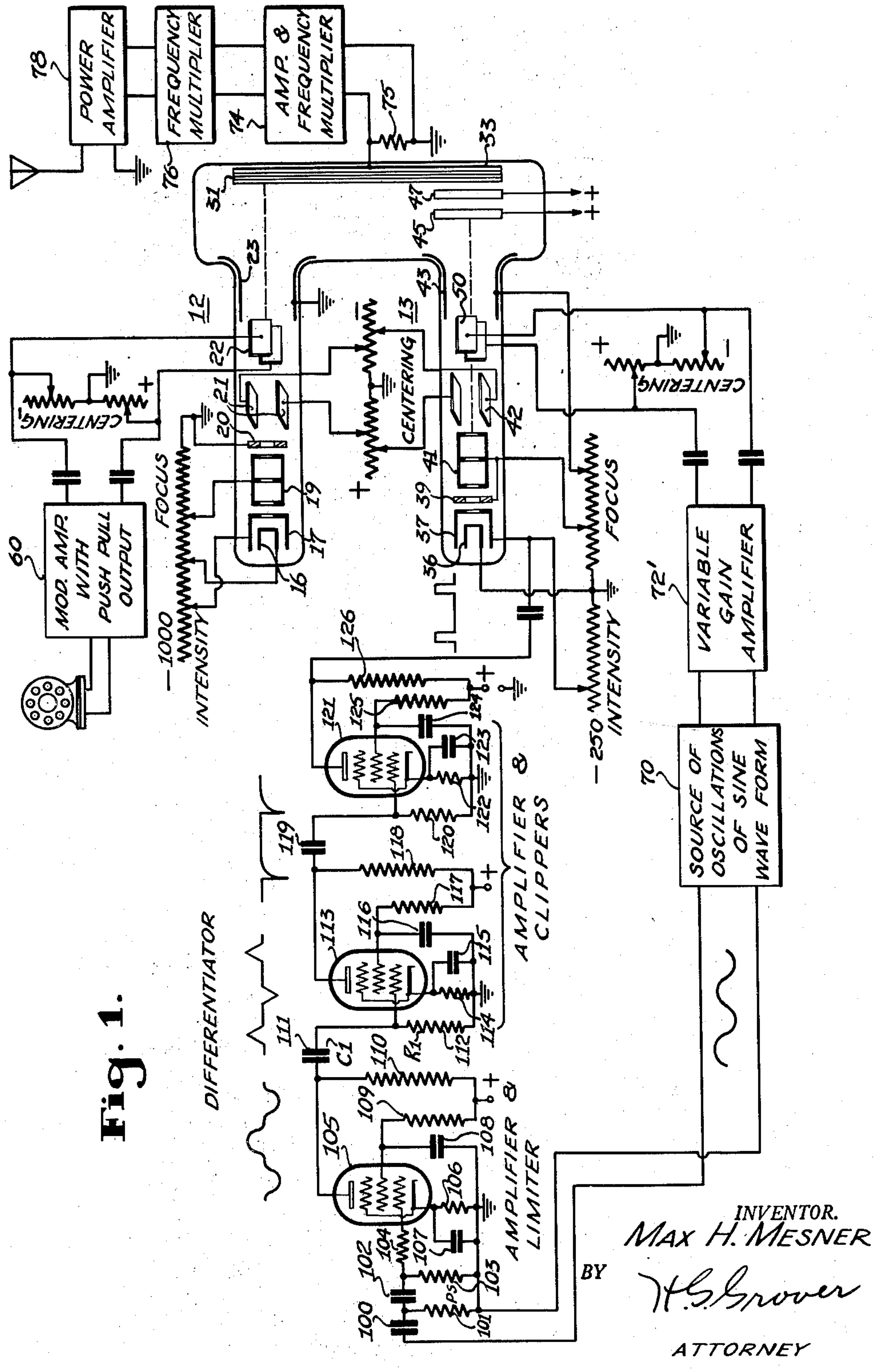

This application concerns a new and improved method and means for modulating the angle or velocity or timing of oscillatory energy.

The general broad object of my invention is improved timing modulation of oscillatory energy.

A second broad object of my invention is improved phase modulation of ultra high frequency wave energy.

A third broad object of my invention is improved frequency modulation of ultra high frequency wave energy.

Timing modulation systems known in the prior art can be divided into classes including these general classes. Systems wherein the oscillatory energy is of constant frequency such as derived from a crystal controlled oscillator or similar means, and the oscillatory energy is phase modulated a limited amount by means of a balanced modulator and a 90° phase shifting network. To obtain phase modulation which is the equivalent of frequency modulation the modulation is modified inversely in accordance with its frequency before it is applied to the balanced modulator. Since such modulation is linear for phase shifts equal to about ±30° frequency multiplication of an order of 3000 times is necessary to obtain the final deviation required in present day broadcast systems. This amount of multiplication necessary to satisfy requirements can not be obtained in one stage and users of this system are obliged to use additional crystal generators to heterodyne the multiplied currents down for further multiplication. These systems have as an advantage a stabilized center frequency so that usually elaborate frequency control means is not necessary. These systems have the disadvantage of requiring a large amount of multiplication thus entailing the use of a large number of multipliers operating in stages between which heterodyne stages are required to bring the frequency down so that the final frequency is as desired. This use of additional crystal oscillators adds to the complexity of the system and also reduces the overall stability thereof.

Another general class of modulators make use of an oscillation generator the frequency of which is controllable and is modulated in accordance with the signals. A larger amount of modulation is accomplished in this case and the multiplication problem encountered in the systems described above is not present. However, in this case, the oscillator being controllable is a rather unstable source and is apt to drift in frequency so that its mean frequency does not remain fixed.

Means is usually provided to stabilize the mean frequency. This means is usually elaborate and expensive and is an undesirable feature.

An object of the present invention is to provide a timing modulated system wherein the modulated oscillatory energy is of substantially fixed frequency, such as, for example, would be derived from a crystal controlled oscillator and wherein linear modulation through a wide angle of the order of 360° is feasible. In other words, an object of this invention is to provide a system that has the main advantages of the two general types of systems described hereinbefore and yet has none of the disadvantages thereof.

An additional object of this invention is to provide more direct phase or frequency modulation than has been the case in systems known in the prior art. This permits use of a simple, inexpensive tube and circuit arrangement.

A further object of the present invention is phase modulation of a carrier of substantially fixed mean frequency wherein a wide degree of linear modulation is obtainable to thereby reduce the number of frequency multipliers necessary in the system, to produce the desired phase swing or to produce equivalent frequency modulation through a wide range.

In attaining the above objects and others which will appear hereinafter, I make use of a beam tube of the commutator type described in Iams et al. U. S. application Serial #492,658, filed June 26, 1943, now Patent No. 2,454,652, granted November 23, 1948, or in Snyder U. S. application Serial #588,046, filed April 12, 1945, or of the type disclosed in Snyder Serial #600,498, filed June 20, 1945, now Patent No. 2,454,410, granted November 23, 1948. The commutator tubes as described more in detail by Iams et al., and by Snyder in his first mentioned application comprise two electron beam or ray producing systems with deflecting electrodes for each beam and a target swept by both beams. The target in an embodiment comprises a fairly large number of strips of conductive material insulated each from the other across which both beams are swept transversely at different points on the target. One beam is designated as the "put-on beam" and provides means for storing charge on the target or changing the charge thereon. The other beam is designated as the "take-off beam" and discharges the target or changes the charge thereon. The discharge provides current which operates in a load impedance to provide the output. In the disclosures of the applications referred to above, the target is composed to a mica sheet across which are parallel insulated platinum strips which are electrically floating. On the back side of the mica is a platinum coating which is called the signal plate, and which may be the output of the tube arranged for connection to following stages. Two necks of the tube contain the electron guns so mounted that their beams impinge upon opposite ends of the target and sweep across the strips near their ends. A conventional high velocity beam is used for the put-on side, which sweeps across the strips and upon striking knocks off secondary electrons which are attracted to a collector. The individual strips are thus given a positive charge. In the Iams et al. arrangement the second beam is supplied with the correct fields to make the beam strike the target with zero velocity so that the same number of electrons are emitted as were furnished by the second beam (no net change); but if the strip on which it strikes has been charged the electrons are used to neutralize the charge. This discharge actuates the amplifier grid and the signal is amplified.

The commutator tube invented by Snyder and disclosed in the above identified application is broadly similar to that disclosed by Iams et al. in the above identified Iams application. In the tube of Snyder's invention, however, both beams are of high velocity, whereas in Iams et al. the "put-on" beam is of high velocity while the "take-off" beam is of low velocity. Other essential differences between the two tubes will appear hereinafter.

In my application, the put-on beam is deflected in accordance with the modulation so that the extent of its sweep and the number of strips charged (or discharged) is determined by the amplitude of the signal. The take-off beam which is swept across all of the strips at the carrier frequency rate discharges the charge (or recharges the discharge) put on by the put-on beam. The period of discharge is a function of the carrier frequency being equal thereto. The phase of the periods of discharge is a function of the amplitude of the signal, so that from the output is derived pulses the phase of which is varied by signals through a range of about 360°. In all embodiments variation of phase is linear through a selected range. In one embodiment linear phase variation of nearly 360° is obtainable.

The basic principle of my system is as described above. As to details of the operation thereof and other principles involved, the same will now be described. In this description reference will be made to the attached drawings wherein Fig. 1 illustrates a target suitable for use in the put-on take-off beam tube.

Figure 3:
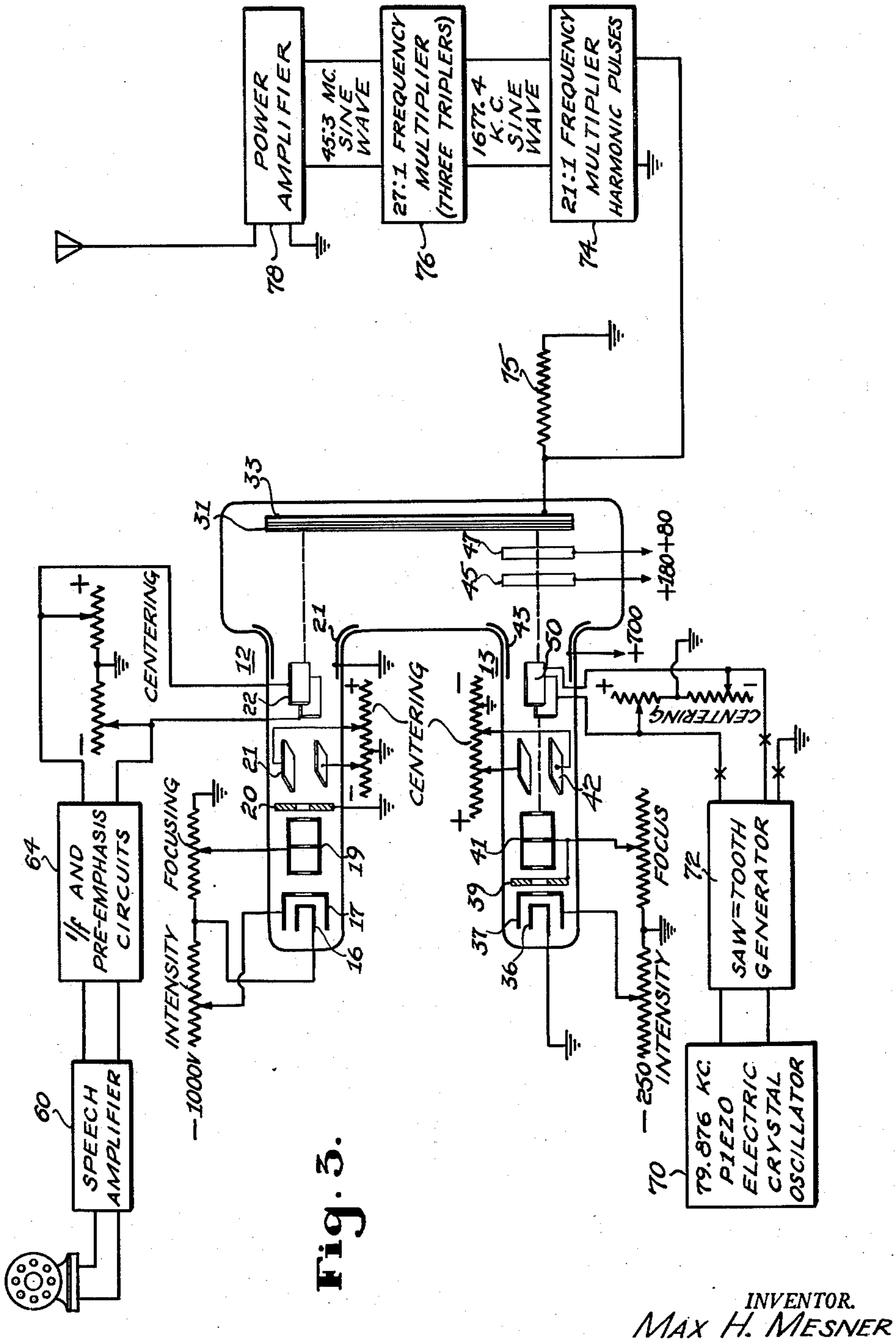

Figs. 1 and 3 each illustrate somewhat in detail my improved timing modulation system including the electron beam tube system of the put-on, take-off beam type, such as disclosed and claimed in the aforementioned Iams et al. and Snyder applications. In Fig. 1 the voltage for sweeping the take-off beam across the target is of sine wave form and the system includes means, to be used where a certain amount of linear pulse phase deviation is desired, to blank-off the take-off beam on as much of the sweep as desired. In the embodiment of Fig. 3, the take-off beam sweep current is of sawtooth wave form to give a large pulse phase deviation. Means is also provided here to modify the modulation currents so that equivalent FM is produced for multiplication.

Figure 1A:
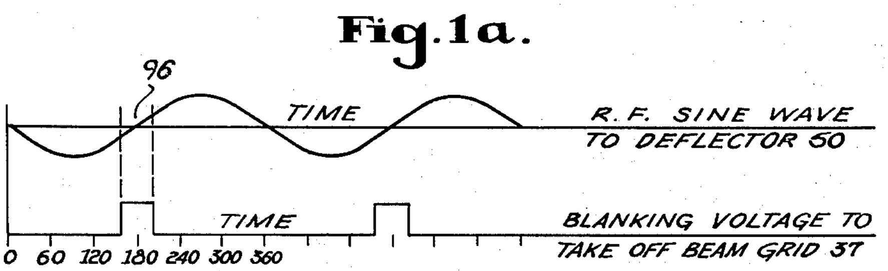

Fig. 1*a* illustrates by curves the character of the deflecting and blanking voltages in the embodiment of Fig. 1.

Figure 2:
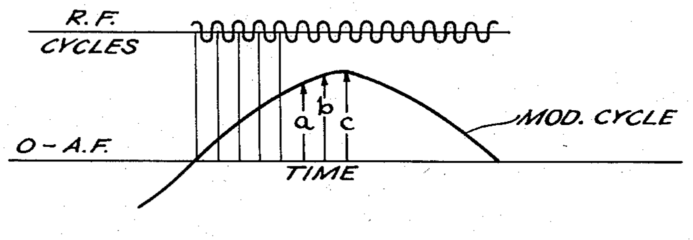
Figure 2A:
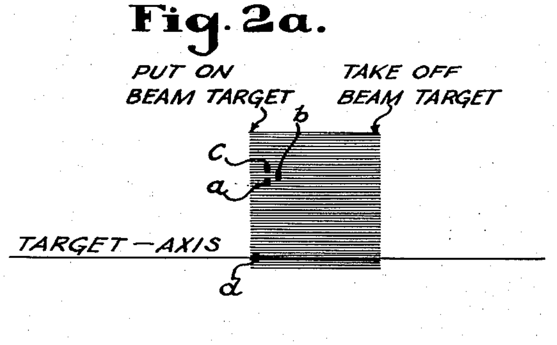
Figure 2B:
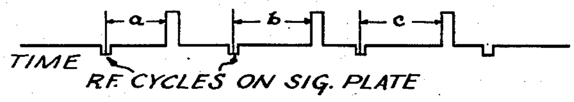

Figs. 2 and 2*a* show graphically what takes place when a modulation current and a radio frequency current are applied to the put-on gun, and illustrate the manner in which the impulses of Fig. 2*b* are derived as an output from the system.

Figures 4, 4A, 4B:
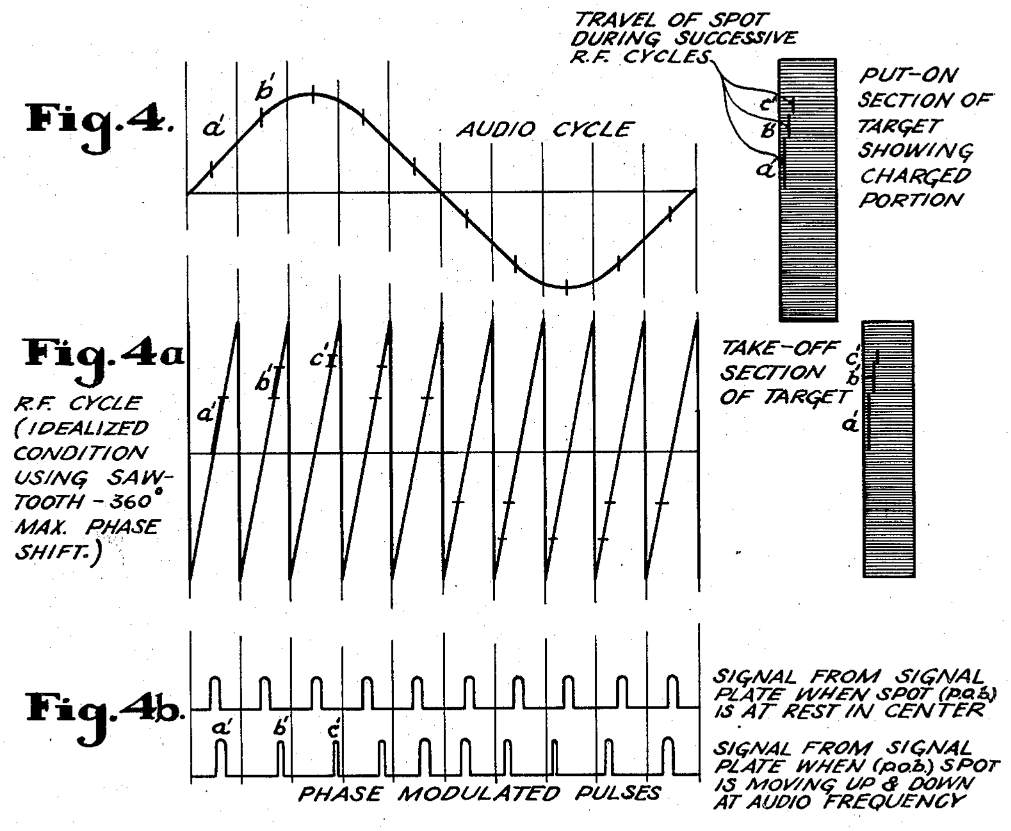

Figs. 4, 4*a*, and 4*b* are respectively, a modulation wave which it is assumed is deflecting the put-on beam, a carrier wave which is deflecting the take-off beam, a pulse output in the absence of modulation and the phase modulated pulse output in the presence of modulation. These graphs, vectors and diagrammatic showings of the electrode are used in explaining the operation of the system.

Figure 5:
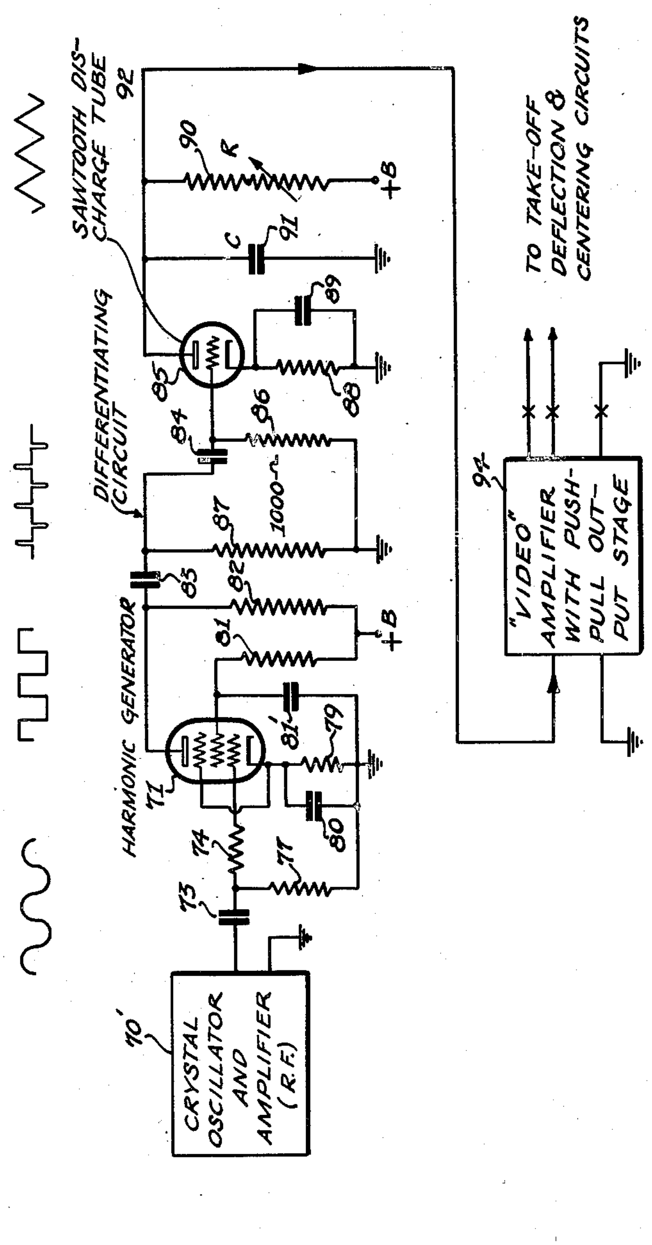

Fig. 5 illustrates the essential features of a sawtooth wave generator for supplying the sweep voltage to the deflecting elements of the take-off beam.

Figure 6:
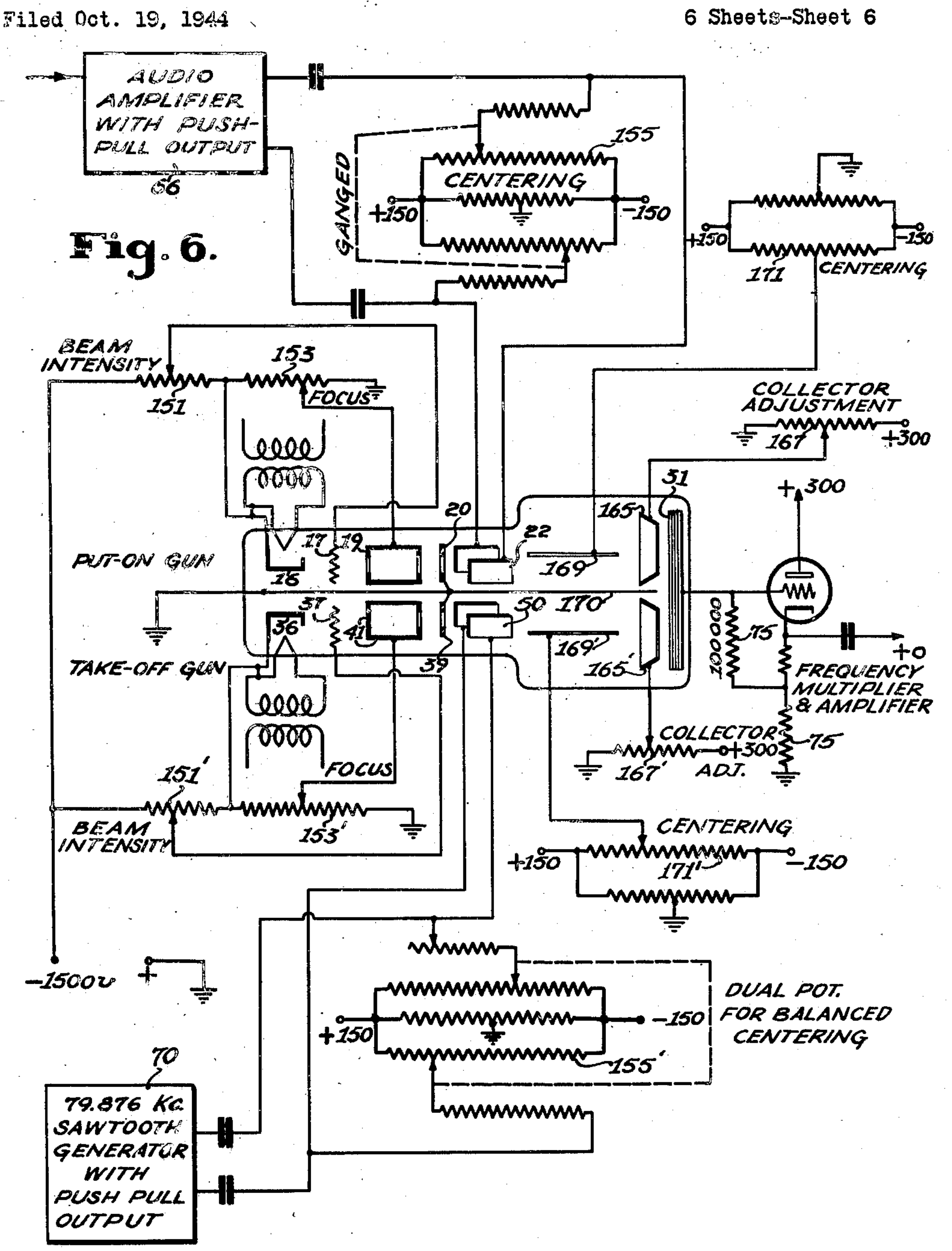

Fig. 6 illustrates application of my improved system to a commutator tube system wherein both beams are of high velocity. In this embodiment the voltage sweeping the take-off beam across the target is shown as being of sawtooth form, and it may be derived as described in connection with Fig. 5. It may be of sine wave form and blanking may be applied as in Fig. 1.

Referring to Figs. 1 and 3, 12 designates generally the put-on beam electrode assembly, and 13 designates generally the take-off beam electrode assembly. In Iams' et al. disclosure referred to above, at 12 is produced a high velocity beam and at 13 is produced a low velocity beam.

The high velocity beam elements comprise a cathode 16, a control grid 17, a first anode 19, a second anode 20, deflecting plates 22, a third anode 23, a target or storage screen 31, and a collector or signal plate electrode 33. Horizontal deflecting plates 21 may be included in the tube structure for preliminary beam focusing and centering adjustment. The operating potentials shown are given only by way of example, since obviously in practice other values may be used.

The storage screen 31, shown as viewed from the cathode in Fig. 2*a*, comprises a plurality of insulated conductive strips which are located at right angles to the sweep of the beam produced by electrode 16, and also at right angles to the beam produced by the other beam producing electrodes at 13. The screen 31 is preferably curved and points on its surface are about equal distances from the electron source, the said screen being in the form of a cylindrical surface, the radius of which is at the center of deflection of the electron beam deflecting electrodes 22. The high velocity beam producing assembly per se is in general similar to the high velocity television pick-up tube known as the Iconoscope.

The beam producing structure at 13 has an electron beam source 36, a control electrode 37, a screen grid or anode 39, a beam concentrating anode 41, horizontal beam centering and focusing electrodes 42, a second anode 43, and two frame-like electrodes 45 and 47 for slowing down the electrons after they leave the region of the second anode 43. The cathode is at ground potential and the electrodes are arranged and operated to produce a low velocity beam (similar to Orthicon), which is swept transverse to the length of the strips of the target 31 in accordance with oscillations applied to the deflection plates 50, Figs. 1 and 3. Deflection plates, are desirable in this application in preference to a set of deflecting coils owing to the high frequencies involved. This is more especially true in the case of the sawtooth deflection. By resonating, a deflection coil could be used for sine wave, however. The electrons of this beam wipe off the charge (positive or negative) placed on the screen 31 by the put-on beam at 12. The back of the mica sheet is coated with metal and being coupled, by capacity, to the strips of storage target 31, forms a signal plate 33 from which the output may be taken, if desired. A separate output electrode may be used or an electron multiplier electrode receiving the unused electrons of the take-off beam as they are returned from the target electrode 31 may supply the output, as described by Iams et al. In my system, outputs as described in said applications may be used. Moreover, the target 31 may be homogeneous rather than being comprised of parallel conductive strips. For example, the storage target may be a sheet of mica. The put-on beam charges a spot on the mica. Since the mica is an insulator the charge does not spread. The take-off beam is directed to scan the same place that the put-on beam scans thereby discharging the charge put on by the put-on beam. The two beam axes are arranged to converge the beams on the one spot. In order to facilitate tracking the beams the trace may be broadened from a line to a band by deflection in the crosswise direction, or by using an elliptical spot. This embodiment is in other respects similar to the embodiments described in detail hereinafter.

In the Iams et al. system the beam deflections are centered by potentials applied to the horizontal plates at 21, and the sweep voltages are applied to electrodes 22 in such a manner that the beam is deflected entirely across the screen 31. The signal is applied to the control grid 17 to modulate the beam intensity and the signal is put on the screen at the sweep rate. The deflecting elements 50 (Figs. 1 and 3) are so operated that the take-off beam is likewise deflected across the other end of target 31 and the signal is taken off at the rate at which the take-off beam is deflected.

In my improved system, I utilize this commutator tube for the purpose of phase modulating a radio frequency signal in accordance with voice or other signals. The used output may be pulse energy which varies in pulse phase in accordance with the signal. The output may be of sine wave form the phase of the wave energy being modulated in accordance with the signals. In this embodiment the phase modulated pulses excite a tuned circuit from which this conventional form phase modulation is derived. In a further embodiment, the modulation potentials are modified inversely in accordance with their frequency so that phase modulation equivalent to frequency modulation is produced.

In accordance with my invention the voice signals from source 60 are applied in push-pull relation to the deflection electrodes 22 so that the beam is swept across a number of the strips of target 31, depending upon the amplitude of the modulation signals. The take-off beam is swept entirely across the target 31 by oscillatory energy applied from source 70 to the take-off deflecting elements 50. This oscillatory energy is the radio frequency energy, and supplies the carrier frequency of the phase modulated pulse output. The output is taken from the signal plate 33 or a collector electrode arranged in accordance with prior teaching in the cathode ray tube art. These oscillations for deflecting the second beam may be of sine wave form (Fig. 1), or of sawtooth wave form (Fig. 3), as will appear more in detail hereinafter.

Assume that a modulating current of the wave form shown in Fig. 2 is applied to the deflecting elements 22 of the put-on beam to sweep the same at right angles to the axis of the strips of the commutator tube's target 31. This wave form may represent voice signals. The put-on beam grid is adjusted to give a beam a suitable intensity to throw on the target 31 a suitable spot. Since there is no deflection of the electron beam along the axis of the strips of target 31, the beam is merely jumping or sliding up and down at an audio rate and with a displacement from zero or rest position, depending upon the amplitude of the audio signal. For example, when the audio cycle is of an amplitude *a*, the beam will be moved up to strike the target, Fig. 2*a*, at the point *a*, for an amplitude *b* at the point *b*, and for an amplitude *c* at the point *c*. (The points *a*, *b* and *c* at the target are shown displaced for convenience. In practice they would be along the same vertical line.) The take-off beam is swept in a path at right angles to the strips on the target 31, and at the other end thereof at say a radio frequency of wave form indicated in Fig. 2, the target is discharged each time the beam sweeps thereacross at radio frequency. In other words, the take-off beam current is adjusted to a value such that the value of a charge (+ or −) put on by the put-on beam is completely wiped off with a single sweep of the take-off beam. This means that as the take-off beam sweeps across in a radio frequency cycle it discharges the target each time, and that the charge put-on between successive sweeps will occur at the phase of the radio frequency cycle represented by the position of the put-on beam during the time when the take-off beam crosses the target, or in other words, by the amplitude of the audio signal. As this audio amplitude changes the pulse obtained from the action of the target will change in phase because the charge causing it will be stored at a different spot on the commutator target. In other words, the take-off beam reaches the charged point or strips on the target at a different point in the radio frequency cycle when the put-on beam is moved up and down in accordance with the modulation. The output will appear across resistance 75, Figs. 1 and 3, and will be designated in Fig. 2*b*.

Where a homogeneous target is used at 31 as described above, the beams are arranged to fall on the same spot on the target (say mica), and the operation is in general about the same as when a target comprised of parallel conducting strips is used.

In the system described above the maximum frequency output is limited to the top band width at which the equipment may be made to operate successfully, i. e., the frequency is limited to the highest frequency at which the take-off beam may be swept across the target. The phase pulse modulation output may be used as desired and the phase deviation may approach 360°. The output taken from the impedance 75 may be amplified and used as phase modulated pulse energy, or may be resonated in tuned circuits and thereby converted to phase modulated wave energy of sine wave form.

If desired, the phase modulated pulse obtained as indicated above in connection with Figs. 1 and 3 may be used to excite a frequency multiplier, and I then transmit a more or less standard phase modulated signal. The harmonics predominating in the pulse output are of sufficient strength for good frequency multiplication. The desired multiplication is obtained by multipliers in units 74 and 76. Phase modulated oscillations of sine wave form are supplied to the power amplifier 78.

The modulating potentials used to deflect the put-on beam may be modified inversely in accordance with their frequency by known apparatus included in 64, Fig. 3, so that equivalent frequency modulation is derived and after multiplication a frequency modulated output of wide deviation is obtained. Multiplication here is accomplished as described above by feeding the output from 75 to cascaded multipliers 74 and 76, and thence to a power amplifier 78. The pulses at 75 shock excite tuned circuits in the multiplier stages and frequency modulated wave energy of sine wave form is derived. The frequency multipliers per se may be conventional and will not be described in detail herein.

The radio frequency take-off beam sweep voltage may be supplied in various ways. I may use a sine wave as the take-off beam deflecting voltage and may use more or less of the sine wave cycle. By selecting a part of the wave form which is linear a fair amount of linear phase modulation is obtainable. Then the arrangement may be such that the take-off beam is blanked-off during the rest of the sine wave cycle. Alternatively, the voltages of sine wave frequency may be such as to sweep the take-off beam across the target during the linear portion of the cycle and off the target during the rest of the sine wave cycle.

In a further embodiment I may use a sawtooth deflecting wave. The phase deviation may be limited to say a small part of the sawtooth cycle, say ±25°, in which case the steep sides and sharp corners thereof need not be used. The return sweep time is short and no blanking voltage is necessary. Moreover, I may use only the linear portion in the center of the wave. For accurate full cycle sawtooth operation 100 kc. is perhaps the present practical limit from an engineering standpoint. By using only the best ±25° of the sawtooth and letting the rest be deflecting the take-off beams outside the target limits, then a sawtooth several times this frequency may be used without requiring amplifiers of unusually great band width.

In the arrangement illustrated in Fig. 3, the source connected with the deflecting elements 50 is of sawtooth wave form, and the amplitude thereof is made such that the take-off beam is deflected across the target during the linear portion of the sawtooth wave and beyond the target limits by the non-linear portion thereof. When a sawtooth of good form is used the operation then is as illustrated in Figs. 4, 4*a* and 4*b*. In this figure, I have assumed the R. F. cycle is idealized, and being of perfect sawtooth form. This provides a pulse phase shift of 360°. In the absence of modulation the put-on beam spot is at rest on the horizontal axis of the target at the put-on beam end thereof, and the output derived when the sawtooth wave form voltage is applied to the deflection elements is an indicated in the top line of Fig. 4*b*.

When the modulation is applied to the deflecting elements 22 the put-on beam is swept in accordance with the modulation cycle and during the portion *a'* of the modulation cycle sweeps over a number of elements to travel the distance *a'* on the target, Fig. 4. The radio frequency of sawtooth wave causes the take-off beam to pass over the entire target during this time *a'* designated in Fig. 4*a* to produce an impulse *a'*, as shown in Fig. 4*b*.

As the modulation cycle passes through the time *b'* it sweeps the beam across the section of the target designated *b'*. During this time the radio frequency cycle passes the beam across the entire take-off section of the target to produce a pulse *b'*, as shown in Fig. 4*b*. Note that the phase of the pulse is changing in accordance with the amplitude of the audio cycle and that this pulse phase may change through 360°. When the spot is on the center target at rest the pulse output is of constant phase, as shown in the upper line of Fig. 4*b*.

By producing a linear sawtooth wave at the fundamental frequency at 72 (79.876 kc. in the case illustrated), and applying the same to the deflection elements 50, linear phase shifts in the pulse coming from the signal plate 33 exceeding 300° are practical. The fundamental equation $\Delta F = f\Delta\theta$ (where F is center frequency; $f$ is signal audio frequency at unit 60; $\Delta F$ is frequency excursion one side of center; and $\Delta\theta$ is phase displacement one side of center, expressed in radians), allows the calculation of the equivalent FM. Since for a fixed maximum frequency deviation, $\Delta\theta$ is greatest for the lowest audio frequency to be transmitted unattenuated, 50 C. P. S. will be assumed as a minimum audio rate. Then $$2\Delta F = (50)\frac{(302.5°)}{57.3} = 26\ 4.2 \text{ C. P. S.}$$

where $\Delta\theta = 151.25°$. In order to get 150 kc. as a total swing 264.2 need be multiplied by only 567. Then this 567 will be the factor for frequency multiplication. Supposing the assignment is for 45.3 mc., then the fundamental frequency will be $$\frac{(45.3)10^6}{567}$$

or the 79.876 kc. illustrated.

The correct amount of modulation will be attained by adjusting the amplitude of the signal on the put-on beam deflection elements 22 so that it never exceeds $$\frac{302.5}{360}$$

of the R. F. sawtooth deflection. Thus, by using a large $\Delta\theta$ need for large multiplication, and for heterodyning is eliminated. As can be seen from the circuit arrangement of Fig. 3, the equivalent FM is produced from a single crystal oscillator, which can be made sufficiently stable, and modulation produced quite simply by the commutator tube. This is directly multiplied along with the frequency without necessitating a heterodyne circuit. The development of this circuit as illustrated should serve greatly to remove many of the complications from FM transmitter design. My novel modulator including the commutator tube may be put to general use as an exciter in many presently known and used systems wherein a chain of multipliers and amplifiers is excited by a phase modulator using modulation potential correction to produce equivalent frequency modulation. The 21:1 multiplier might consist of a conventional multiplier stage in which the plate tank is tuned to 1677.4 kc. with band pass circuits, the high value of single stage multiplication being feasible because of the high harmonic content of the pulses placed on the grid. If the put-on spot size were made to cover about 1/30 of the target, then the resulting pulse width would be very close to ½ cycle of the 1677.4 kc. wave or .3 micro-second and the pulse output of the C. T. would have an extremely strong 21st harmonic. The spot size is discussed in detail hereinafter.

Circuits wherein the modulating currents are modified inversely in accordance with their frequency $$\left(\frac{1}{f}\right)$$

and preemphasized are known in the art, and no claim to the same per se is made herein. These circuits which need no detailed description are included in unit 64. The purpose of the circuits is to correct for $$\frac{\Delta F}{f}=\Delta\theta$$

when ΔF is fixed (by convention) then $\Delta\theta$ increases as $f$ decreases. The $$\frac{1}{f}$$

network then gives the same phase swing for higher frequency as for 50 C. P. S.—this is conventional PM practice.

The sawtooth generator of unit 72 per se may be conventional. For example, I may use any sawtooth generator, of the many known in the prior art, as long as the essential requirements outlined above are met. Preferably, I make use of a sawtooth generator and amplifier such as might be used for producing the sweep voltage for oscilloscopes, and in particular a generator with a wave distorter, sawtooth generator and amplifier. In Fig. 5 I have illustrated the essential features of a sawtooth wave generator for use here.

The crystal oscillator and amplifier are denoted by block 70′. It is coupled to the grid of tube 71 (pentode type) by condenser 73 and resistor 74, D.-C. return being furnished by resistor 77. Grid bias is produced by the cathode current going through resistor 79 by-passed for A. C. by condenser 80. Resistor 81 is a conventional screen grid voltage dropping resistance that is by-passed by condenser 81′. Resistor 82 is the plate load resistor. The voltage appearing on the plate of tube 71 is coupled by condensers 83 and 84 to the grid of tube 85. Resistor 86 acts as a D.-C. return and resistor 87 forms a differentiating circuit in conjunction with condenser 83. For tube 85 the cathode is grounded by resistor 88 bypassed by condenser 89. Variable resistor 90 is the plate load and condenser charging resistor. Condenser 91 is the sawtooth capacitor. The output is coupled to the video amplifier 94 which furnishes pushpull video to the take-off centering and deflection circuits.

The operation is as follows: Sine wave voltage at a carrier frequency rate (in the case illustrated 79.876 kc.) is produced by the crystal controlled oscillator and amplified by a conventional radio frequency amplifier to a suitable value. Tube 71 is a harmonic generator, or to put it differently, a square wave generator. Square waves are produced by the clipping action of tube 71. On the positive swing the tube is driven into grid current where, by the dropping action of resistor 74, the more positive portion of the cycle reaching the grid is clipped giving a sine wave with most of the positive portion flattened. On the negative swing the tube is driven to plate current cut-off whereby the other half of the sine wave (as it appears on the plate load resistor 82) is clipped. Both halves have been clipped and a square wave results which is rich in harmonics. This square wave is fed to the differentiating circuit 83 and 87. The lower frequencies are eliminated by the filter action of the circuit leaving the high frequency components which appear in the form of positive and negative pulses. Triode 85 is biased to cutoff by the bias developed on resistor 88 plus that developed by grid current on resistor 86. For this reason the negative pulse then has no appreciable effect but the positive pulse causes the tube to conduct bringing the potential at connection 92 down to a value slightly above ground level.

After the pulse has been completed, the tube resumes its cutoff condition and condenser 91 then charges positively from the plate supply through resistor 90 in an exponential manner. If allowed to charge indefinitely, terminal 92 would eventually charge to a value equal to the plate supply voltage. However, if the time constant of resistor 90 and condenser 91 is large enough, the condenser will have charged positively only a small amount before the next pulse occurs. The pulse initiates the discharge of condenser 91 through tube 85 as before. Thus since only a small portion of the exponential charging curve is used, the sawtooth is nearly linear. Since resistor 90 is adjustable, it furnishes a control of amplitude and linearity. The sawtooth thus generated is amplified by the video amplifier 94. A video frequency amplifier is used to pass the high frequency components appearing in the sawtooth. Since push-pull deflection is preferred, the video amplifier as shown contains a phase inverter tube and a push-pull output tube. These above described circuits are conventional pulse practice.

When the wave energy used to deflect the take-off beam is of sine wave form, blanking on the grid of this tube structure for a portion of the deflection voltage cycle may be used. In the embodiment illustrated in Fig. 1, for example, I make use of one slope of the sine wave and use the most linear part of the cycle, say for about ±25°, or a portion thereof of this order, as indicated at 96 in Fig. 1*a*. For the rest of the sine wave cycle I blank off the take-off beam grid. Since the deflection is "stretched" to fill the target for the ±25° used, the blanking pulse does not have to be one with steep sides, being only necessary to blank off the "return" portion. In this way the amplifier and circuits for blanking may handle 300 or 400 kc. or possibly higher without requiring such great band width to pass harmonics. In order to "stretch" the deflection the sine wave voltage from 70 is amplified in 72′ the desired amount and the initial biasing potentials on the deflecting electrodes are of a value such that the take-off beam traverses the full width of the target 31 during the selected linear part of the sine wave cycle.

The means for supplying the blanking voltage to the control grid 37 will now be described with reference to Fig. 1 of the drawings.

It is desired that a pulse be generated which will switch the take-off beam "on" by driving the storage tube grid positive and that the "on" period will coincide with the more nearly linear portion of the sine wave. This is shown in Fig. 1*a* as being the portion immediately about the A.-C. axis of the wave.

Tubes 105, 113, 121, and associated circuits in Fig. 1 act as a pulse forming circuit producing a square-type pulse of the proper width. In order to phase the pulse to occur at the correct portion of the sine wave cycle, a phase shift network is used. One of the R-C variety is shown. The sine wave after passing through the condensers 100 and 102 and resistor 104 is amplified and clipped by tube 105. Resistors 101 and 103 act in conjunction with the condensers to produce the desired phase shift. Resistor 104 aids the clipping. This clipping action is described in the specification of the sawtooth generator, this being a similar pulse forming circuit. Since the grid is swung from past plate current cutoff beyond a grid current condition, a square wave results on the plate load resistor 110. The cathode circuit is completed through resistor 106 and condenser 107. Resistor 109 and condenser 108 form the usual screen grid dropping circuit. This square wave is passed into the differentiating circuit composed of condenser 111 and resistor 112 resulting in the usual alternating positive and negative pulses appearing on the grid of 113.

Pentode 113 is operated with a high bias created by resistor 114 in the cathode, condenser 115 by-passing the A. C. Because of this the negative pulse from the differentiator is clipped off and the positive pulse is amplified and appears as a negative pulse on the plate load resistor 118. Resistor 117 and condenser 116 are the usual screen components. This negative pulse is then fed to tube 121 which is operated with a bias not quite so near cutoff as tube 113. A proper value of resistor 122 in the cathode assures this. The sharp peak on the wave is clipped as the grid swings past cutoff leaving to be amplified the unclipped part of the pulse near the axis. A resulting square top steep sided pulse of positive polarity appears on lead resistor 126, the plate of 121, and likewise on the take-off grid of the storage tube. This positive pulse on the grid then allows the beam current to flow for the pulse duration at which time the chosen portion of the sine wave that occurs at this time has caused the take-off beam to be deflected across the target. The width of the pulse is controlled by the selection of the time constant for the differentiating circuit C1 and Rf. The phase modulated pulses repeating at 400 kc. may be used to excite the tuned circuit of a first multiplier supplying cascaded multipliers which boost the frequency of the phase modulated carrier to the desired ultra high frequency range. This embodiment is of particular importance where simple modulation circuits are required, or for modulation of police and communication transmitters.

In Figs. 1 and 3 the electron beam tube system which produces the take-off beam is of the low velocity beam type, while the put-on beam electrode producing system is of the high velocity type. In a preferred embodiment of my invention both electron beam tube systems are of the high velocity type. This embodiment has been illustrated in Fig. 6. In the embodiment of Fig. 6 the wave energy controlling the deflection of the take-off beam is shown as being of sawtooth wave form. It will be understood that wave energy of sine wave form may be used here as in Fig. 1, and also that wave energy of sine wave form and blanking voltages may be used with the tube wherein both beams are of the high velocity type. In other words, the storage tube using the high velocity electron beams of Fig. 6 may replace the storage tubes using the high velocity put-on beam and the low velocity take-off beam of Figs. 1 and 3.

In Fig. 6 the separate electron guns of the storage tube are similar in many respects to many cathode ray tube guns. In this figure the reference numerals correspond in so far as possible to the reference numerals used in Figs. 1 and 3. The grids 17 and 37 of both tubes are controlled by controlling the potential thereon with respect to the cathode. Note that in the arrangements illustrated the cathode is at a negative potential with respect to ground and that the control grids are at a higher negative potential. The control grids 17 and 37 are connected to the taps on potentiometers 151 and 151'. The anodes 19 and 41 are used to focus the beam and are connected to taps on potentiometers 153 and 153' respectively. Note that the anodes here are connected in substantially the same manner in which the anode 19 is connected in Figs. 1 and 3. The second anodes 20 and 39 are connected to ground. The beam intensity potentiometers and the focusing potentiometers are connected in the form of a voltage divider across a source of potential the positive terminal of which is grounded. The deflecting electrodes 22 and 50 are connected to centering resistance networks 155 and 155' respectively. These deflecting electrodes sweep the beams across the targets as in the prior embodiment so that the beams traverse the conductive elements of the target. The centering adjustment of the beam increases or decreases the voltage difference between the plates 22 and between the plates 50 without changing the mean voltage which is kept at ground or second anode level. The two potentiometers of the centering adjustment 155 may be mounted on the same shaft and connected so that one plate rises in potential while the potential on the other plate is lowered. The high velocity tube systems each include collector electrodes 165 and 165'. These electrodes are connected to taps on potentiometers 167 and 167' and operated in the usual manner to collect the secondary electrons struck from the target. Cross-centering of the respective beams so that they traverse the desired point on the target electrode 31 is accomplished by adjusting the potential on the cross-deflection electrodes 169 and 169' respectively. Potentiometers 171 and 171' are provided for adjusting the potentials on the cross-deflecting plates 169 and 169' respectively with respect to ground or second anode potential.

The voltage adjustment of the collectors is provided so that a charging and discharging action by the beam will take place. If the collector 165 of the put-on beam is operated positive with respect to the collector 165' of the take-off beam, then put-on secondary electrons will be attracted to the collector 165 and the target strips will be charging positively. The take-off collector 165' then being negative will cause the secondary electrons from the take-off beam to stay on the target thereby charging it negatively or effectively discharging the strips. Operation may be had also with the put-on collector electrode 165 negative with respect to the take-off collector 165'. In this case then the secondary electrons will stay on the target strips since the put-on beam collector electrode 165 is negative. The target strips will now be charged negatively by the put-on beam as swept thereacross in accordance with the modulation. The take-off collector being positive will collect the secondary electrons struck from the target by the take-off beam, thereby discharging the target or effectively positively charging the strips. In either case pulses of the frequency of the wave energy from source 60 appear across the impedance 75, as described in detail hereinbefore in connection with Figs. 1 and 3.

In view of the fact that secondary electrons are produced by the put-on beam and the take-off beam, a shielding member 170 is located within the tube between the put-on gun electrodes and the take-off gun electrodes to shield the same each from the other. The metallic shielding member 170 is operated at ground or second anode potential. In this embodiment also the target 31 comprising the insulated conductive strips may be replaced by a homogeneous target such as for example as would be provided by the mica sheet on which the parallel conductive strips are mounted. Then as described hereinbefore, the put-on and take-off beams are arranged to fall on the same point on the target.

The storage tube using two high velocity electron beams of Fig. 6 is substantially as disclosed in Snyder U. S. application Serial No. 588,046, filed April 12, 1945.

Referring to the Figs. 4, 4*a*, and 4*b*, it can be observed that if the spot size of the put-on beam is increased the charged areas *a'*, *b'*, and *c'* will each increase in size by the amount of the spot increase. Half of this increase will appear on each side of the area, hence a wider pulse will result in all cases, which will still have the same phase relations as far as the center is concerned. A wider pulse in some cases would be advantageous for two reasons—the inherent variation in pulse width due to varying slope of signal (audio) frequency wave, would be minimized since the pulse would be wide compared to the variations and secondly, a wider pulse might be desirable to tie in well with the frequency of the first multiplier, as explained hereinbefore.

As far as number of commutator tube elements is concerned, a better "resolution" would be needed for the lower frequencies of audio, where each audio cycle is divided up into a greater number of R. F. cycles. At the zero slope part of the sine wave successive R. F. cycles would register no change in phase if the target resolution were poor. When the spot then moved to the next line a jump in phase would occur. The audio cycle would then be divided into stair steps which would means harmonic distortion. At low frequencies these harmonics would fall within the audio range. At higher frequencies the "stair-stepping" would occur between adjacent R. F. cycles and here the ratio of R. F. to audio would be the controlling factor, rather than target elements. In the case illustrated, the 5.3:1 ratio would mean that on the highest audio frequency of 15,000 C. P. S. the wave would consist of approximately five sections. Here the harmonics are not harmful, being inaudible and could be removed by a filter. The amplitude of the fundamental would be reduced somewhat but according to a definite law and such reduction could be easily compensated for. As for the low frequency "stair-stepping"—if the target has a resolution of 300 lines as has been proved practical, a 50 cycle wave would have a 300th harmonic component of 15,000 cycles which is on the upper edge of hearing. In addition the amplitude would be very small. This means that the 300 line tubes which have been constructed would be sufficient for this application.

Since there is no "side-by-side" resolution required as in a television picture, but just a single isolated pulse during each R. F. cycle, the same may be said for the take-off spot size as is true for the put-on. A larger take-off spot size than the put-on spot size would mean a wider pulse; so here too it is not critical but a function of the desired pulse width for most advantageous operation of the frequency multiplier.

I claim:

1. In a signalling system, in combination with a tube having a target comprising a plurality of parallel conductive strips insulated from each other, and an electron beam producing system which produces an electron beam which falls on a conductive strip intermediate the outer strips, means for deflecting said beam across said target in accordance with signals and in a direction transverse to said strips, and means cooperating with said strips for generating wave energy the phase of which corresponds to the position of the beam spot on the target.

2. In a signalling system, in combination, an electron beam producing system which produces an electron beam and projects the same along a path, a target comprising a plurality of parallel conductive strips insulated from each other in the path of said beam which falls on a strip intermediate the outer strips, means controlled by signals for deflecting said beam across said strips in a direction transverse to said strips, means cooperating with said strips for generating wave energy the phase of which corresponds to the position of the beam spot on the target, and means for modifying said signals which control deflection of the beam inversely in accordance with their frequency.

3. In a signalling system, in combination with a tube having a target comprising a plurality of parallel conductive strips insulated from each other, and an electron beam producing system which produces an electron beam and projects the same toward said target, means controlled by signals for deflecting said beam across said target in a direction transverse to said strips, means cooperating with said strips for generating wave energy the phase of which corresponds to the position of the beam spot on the target, and means for multiplying the frequency of said generated wave energy.

4. In a signalling system, in combination an electron beam producing system which produces an electron beam and projects the same along a path, a target comprising a plurality of parallel conductive strips insulated from each other in the path of said beam which falls on a strip intermediate the outer strips, means controlled by signals for deflecting said beam across said strips in a direction transverse to said strips, means cooperating with said strips for generating wave energy the phase of which corresponds to the position of the beam spot on the target, means for modifying the amplitude of the signals inversely in accordance with their frequency, and a frequency multiplier excited by the generated wave energy.

5. In an angle modulator in combination, a storage screen comprising a plurality of parallel conducting strips insulated from each other, means for producing a beam directed toward said strips, signal controlled means for sweeping said beam in a path which traverses said strips, means for producing a second beam directed toward said strips, means for sweeping said last beam across said strips at a carrier frequency rate, and means for collecting the energy obtained by the sweep of said second beam.

6. In a signalling system, in combination with a tube having a target on which a charge may be stored, and first and second electron beam producing electrodes for producing two beams which strike said target, beam deflecting means excited by control potentials for deflecting one beam across said target to charge the same, beam deflecting means excited by oscillations of carrier wave frequency for deflecting the other beam across said target to discharge the same, and an output circuit excited by electrical energy representative of the charge on said target.

7. In a signalling system, in combination with a tube having a target comprising a plurality of parallel conductive strips insulated from each other, and first and second electron beam producing electrodes for producing two beams which strike said target, beam deflecting means excited by control potentials for deflecting one beam across said target in a path which traverses said conductive strips, beam deflecting means excited by oscillations of carrier wave frequency for deflecting the other beam across said target in a path which traverses said conductive strips, and an output circuit excited by electrical energy representative of the charge on said target.

8. In a signalling system, in combination, electron discharge means including first and second electron beam producing electrodes for producing two beams of electrons and propagating each of the same along a path, a plurality of parallel conductive strips insulated from each other and arranged in a target surface transverse to said path, beam deflecting means excited by modulation potentials for deflecting one beam in a path which traverses said conductive strips, the extent of the beam displacement from its rest position being a function of the modulation potential, beam deflecting means excited by oscillations of carrier wave frequency for deflecting the other beam in a path which traverses said conductive strips and to an extent sufficient to sweep over all of the strips traversed by said one beam, and an output circuit coupled to said target.

9. In a signalling system, in combination, electron discharge means including first and second electron beam producing electrodes for producing two beams of electrons and propagating each of the same along a path, a target electrode including a plurality of parallel conductive strips insulated from each other and arranged in a surface transverse to said path, beam deflecting means excited by modulation potentials for deflecting one beam in a path which traverses said conductive strips, the extent of the beam displacement from its rest position being a function of the modulation potential, beam deflecting means excited by oscillations of carrier wave frequency for deflecting the other beam in a path which traverses said conductive strips and to an extent sufficient to sweep over all of the strips traversed by said one beam, means for modifying said modulation potentials inversely in accordance with their frequency, and an output circuit coupled to said target.

10. In a signalling system, in combination, electron discharge means including first and second electron beam producing electrodes for producing two beams of electrons and propagating each of the same along a path, a plurality of parallel conductive strips insulated from each other and arranged in a target surface transverse to said path, beam deflecting means excited by modulation potentials for deflecting one beam in a path which traverses said conductive strips, the extent of the beam displacement from its rest position being a function of the modulation potential, beam deflecting means excited by oscillations of carrier wave frequency for deflecting the other beam in a path which traverses said conductive strips and to an extent sufficient to sweep over all of the strips traversed by said one beam, an output circuit coupled to said target, and a frequency multiplier coupled to said output circuit.

11. In an angular modulation system, in combination with a tube having a target electrode including a plurality of parallel conductive strips insulated from each other, and first and second electron beam producing electrodes for producing two beams which strike said target, beam deflecting means excited by control potentials for deflecting one beam across said target in a path which traverses said conductive strips, beam deflecting means excited by oscillations of sine wave form and of carrier wave frequency for deflecting the other beam across said target in a path which traverses said conductive strips, and an output circuit excited by electrical energy representative of the charge on said target.

12. In an angular modulation system, in combination with a tube having a target electrode including a plurality of parallel conductive strips insulated from each other, and first and second electron beam producing electrodes for producing two beams which strike said target, beam deflecting means excited by control potentials for deflecting one beam across said target in a path which traverses said conductive strips, beam deflecting means excited by oscillations of sine wave form and of carrier wave frequency for deflecting the other beam across said target in a path which traverses said conductive strips, means excited by said oscillations for cutting off said other beam for a part of the sine wave cycle, and an output circuit excited by electrical energy representative of the charge on said target.

13. In a timing modulation system, a tube structure comprising a target, a first beam producing arrangement and deflecting electrodes excited by modulating potentials for putting on said target a charge displaced from the rest position of the beam on the target an amount proportional to the modulating potential amplitude, a second beam producing arrangement and deflecting elements therefor excited by oscillations of carrier wave frequency for sweeping said second beam across said target and wiping off said charge, and an output circuit wherein a current flows the periodicity of which is the sweep frequency and the phase of which is proportional to the displacement of said first beam from its rest position.

14. In a timing modulation system, a tube structure comprising a target, a first beam producing arrangement and deflecting electrodes excited by modulating potentials for putting on said target a charge displaced from the rest position of the beam on the target an amount proportional to the modulating potential amplitude, a second beam producing arrangement and deflecting electrodes therefor excited by oscillations of carrier wave frequency and sawtooth form for sweeping said second beam across said target and wiping off said charge, and an output circuit wherein a current flows the periodicity of which is the sweep frequency and the phase of which is proportional to the displacement of said first beam from its rest position.

15. The method of producing phase modulation by an electron beam tube structure having a target and a put-on beam and a take-off beam which includes these steps, generating a first electron beam, deflecting said beam in accordance with amplitude varying currents, to cause the same to trace a path on said target to change the charge on the target, the extent of deviation of said path from the rest position depending on the amplitude of the said currents, generating a second electron beam, generating wave energy of carrier wave frequency, deflecting said second beam across the said target once for each cycle of said wave energy of carrier wave frequency to discharge said target, and producing output voltage proportional to the charge on said target.

16. The method of producing angular velocity modulation by an electron beam tube structure having a target comprising a plurality of electrically separated elongated parallel conductive members which includes these steps, generating a first electron beam, deflecting said beam over the surface of said target in a direction transverse to the length of said members an extent depending on the amplitude of modulating currents, to cause the same to fall at points on said target the position of which with respect to the rest or no-modulation position depends on the amplitude of the modulation currents, thereby changing the charge on the target, generating a second electron beam, generating wave energy of carrier wave frequency, sweeping said second beam across said target in a direction transverse to the length of the target members once for each cycle of said wave energy of carrier wave frequency to discharge said target, and producing an output voltage proportional to the charge on said target, the phase of said voltage depending on the extent to which said first beam is deflected from rest position.

17. In an angle modulator in combination, a storage electrode comprising a surface, points on which may be charged and discharged, means for producing a beam of electrons directed toward said surface, a pair of beam deflecting electrodes, a source of signals coupled in push-pull relation to said deflecting electrodes for sweeping said beam in a path over said surface an extent depending on the signal magnitude, means for producing a second beam of electrons directed toward said surface, a pair of deflecting electrodes for said second beam, a source of oscillatory energy of carrier wave frequency coupled in push-pull relation to said last deflecting electrodes for sweeping said second beam over said surface at a carrier frequency rate, and means for collecting the energy representative of the charge on said surface as modified by the sweep of said second beam.

18. In an angle modulator in combination, a storage electrode comprising a surface, points on which may be charged and discharged, means for producing a beam of electrons directed toward said surface, a pair of beam deflecting electrodes, a source of signals coupled in push-pull relation to said deflecting electrodes for sweeping said beam in a path over said surface an extent depending on the signal magnitude, means for producing a second beam of electrons directed toward said surface, a pair of deflecting electrodes for said second beam, a source of oscillatory energy of sine wave form and of carrier wave frequency coupled in push-pull relation to said last deflecting electrodes for sweeping said second beam over said surface at a carrier frequency rate, and means for collecting the energy representative of the charge on said surface as modified by the sweep of said second beam.

19. In an angle modulator in combination, a storage electrode comprising a surface, points on which may be charged and discharged, means for producing a beam of electrons directed toward said surface, a pair of beam deflecting electrodes, a source of signals coupled in push-pull relation to said deflecting electrodes for sweeping said beam in a path over said surface an extent depending on the signal magnitude, means for producing a second beam of electrons directed toward said surface, a pair of deflecting electrodes for said second beam, a source of oscillatory energy of sawtooth wave form and of carrier wave frequency coupled in push-pull relation to said last deflecting electrodes for sweeping said second beam over said surface at a carrier frequency rate, and means for collecting the energy representative of the charge on said surface as modified by the sweep of said second beam.

20. In a signalling system in combination, electron discharge tube means including first and second electron beam producing electrodes for producing two beams of electrons and propagating each of the said beams along a path, a target electrode comprising a surface arranged transverse to said path, points on which surface may be charged and discharged, a source of modulating potentials, a pair of beam deflecting plates differentially coupled to said source of modulating potentials for deflecting one beam in a path which traverses said target, the extent of the beam displacement from its rest position being a function of the modulation potential magnitude, a source of oscillations of carrier wave frequency, a second pair of beam deflecting electrodes differentially coupled to said source of oscillations of carrier wave frequency for deflecting the other beam in a path which traverse said target substantially along the path followed by said first beam and to an extent sufficient to include all of the path of said first beam, a control grid in the path of said last named beam and coupled to said last named source for cutting off said beam on a portion of each cycle of said oscillations, and an output circuit coupled to said target.

21. In an angular modulation system in combination, a tube having a homogeneous target on which a charge may be built up, first and second electron beam producing electrodes for producing two beams which strike said target in the same area intermediate two of its boundaries to influence the charge on the target, beam deflecting elements adjacent the path of that beam produced by the first electron beam producing electrodes, a source of signals coupled with said deflecting elements for deflecting one beam across said target in a path the length of which depends on the signal magnitude, other beam deflecting elements located adjacent the beam produced by said second electron beam producing electrodes, a source of oscillatory energy of carrier wave frequency coupled to said last named beam deflecting elements for deflecting the other beam across said target along the path of said first beam and discharging the same, and an output circuit coupled to said target and excited by electrical energy representative of the charge on said target.

22. In an angular modulation system in combination, a tube having a storage electrode in the form of a surface, points on which may be charged and discharged, first and second beam producing electrodes for producing two beams which fall in the same area of said storage electrode, beam deflecting elements adjacent the path of one of said beams, a source of signals coupled to said elements for sweeping said one beam in a path which traverses said storage electrode surface, other beam deflecting elements adjacent the path of the other beam, a source of oscillatory energy of carrier wave frequency, a coupling between said last named source and said other elements for sweeping the other beam along a path substantially corresponding to the path of said first beam and at a carrier frequency rate, a conducting electrode coupled to said storage electrode, and an output circuit coupled to said conducting electrode for collecting energy representative of the charge on said target as altered by the sweep of said other beam.

23. In an angular modulation system in combination, a tube having a target comprising a homogeneous surface, first and second beam producing electrodes for producing two beams which fall in the same area of said surface, beam deflecting elements adjacent the path of one of said beams, a source of signals, a coupling between said source and said beam deflecting elements for deflecting said one beam in a path which traverses said target, the length of said path depending upon the magnitude of the signals, other beam deflecting elements adjacent the path of the other beam, a source of oscillatory energy of carrier wave frequency, a coupling between said last named source and said other beam deflecting elements for deflecting the other beam substantially along said first mentioned path, a conductive electrode adjacent said target surface, and an output circuit coupled to said conductive electrode for collecting energy representative of the charge on said target as altered by the deflection of said other beam.

MAX H. MESNER.

REFERENCES CITED

The following references are of record in the file of this patent:

UNITED STATES PATENTS

| Number | Name | Date |
|---|---|---|
| 2,175,573 | Schroter | Oct. 10, 1939 |
| 2,201,323 | Shelby | May 21, 1940 |
| 2,254,036 | Gray | Aug. 26, 1940 |
| 2,265,145 | Clark | Dec. 9, 1941 |
| 2,277,516 | Henroteau | Mar. 24, 1942 |
| 2,290,587 | Goldstine | July 21, 1942 |
| 2,294,209 | Roder | Aug. 25, 1942 |